E. WESTON.
Oiler.

No. 201,140.  Patented March 12, 1878.

Witnesses:
Geo. W. Miatt
Mary L. Adams.

Inventor:
Edward Weston
Per Edw. E. Quimby
Atty.

UNITED STATES PATENT OFFICE.

EDWARD WESTON, OF NEWARK, NEW JERSEY.

IMPROVEMENT IN OILERS.

Specification forming part of Letters Patent No. 201,140, dated March 12, 1878; application filed February 13, 1878.

*To all whom it may concern:*

Be it known that I, EDWARD WESTON, of Newark, New Jersey, have invented a certain Improvement in Oilers, of which the following is a specification:

My invention is especially designed to supply oil to the journals of loose pulleys; and it consists of an oil-cylinder provided with a movable bottom or piston, which, under the action of centrifugal force when the pulley to which the oil-cylinder is attached is rotated, drives the oil out of the cylinder into a small pipe or passage, by which it is conducted to the journal.

By my invention oil is continually fed to the journal so long as the pulley to which the oil-cylinder is attached is rotated; but the feeding operation is intermitted during the period while the pulley is at rest.

Figure 1:
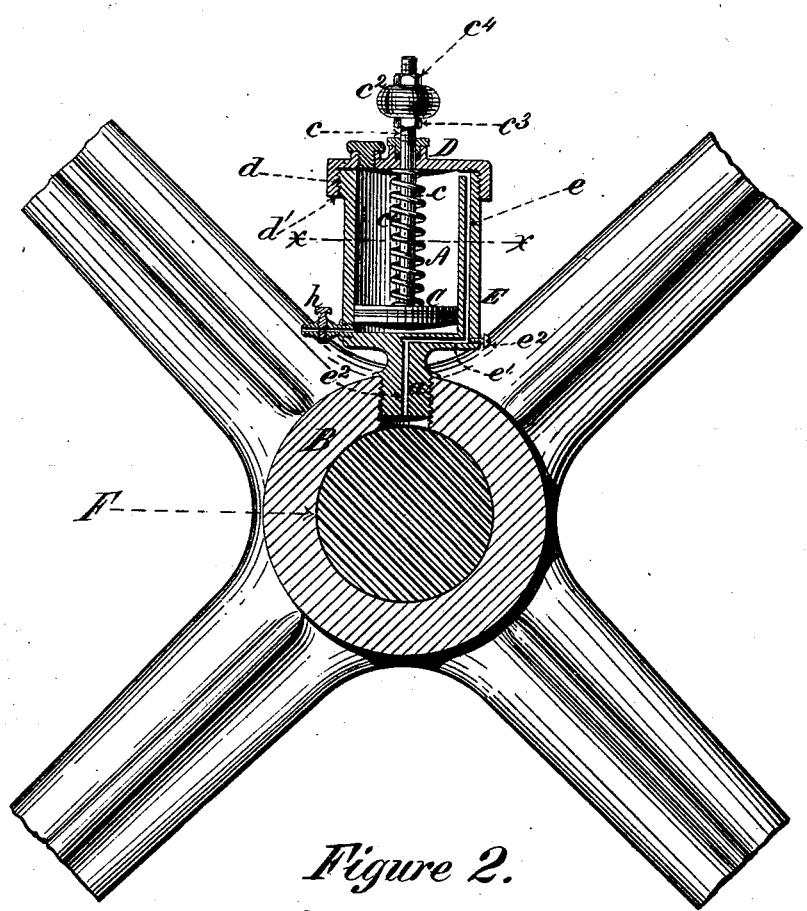
Figure 2:
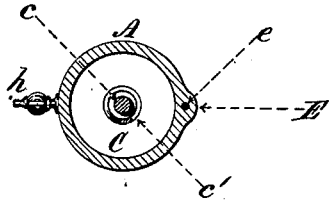

In the accompanying drawings, Figure 1 represents a face view of a pulley, to the hub of which my oil-cylinder is attached, and represents a section of the hub and a central longitudinal section of my oil-cylinder. Fig. 2 is a transverse section through the line $x\ x$ on Fig. 1.

Referring to the drawings, it will be seen that the oil-cylinder A is provided with a hollow stem, by means of which it is screwed radially into the hub B of the pulley. Within the cylinder is a tight-fitting piston, C, the stem of which, $c$, is surrounded by a spiral spring, $c^1$, bearing at one end upon the piston, and at the other upon the inner side of the cap D, which is screwed onto the outer end of the oil-cylinder A.

I make my cylinder preferably of cast-iron, and increase the thickness of the casting at the upper end, to provide material in which to cut the male screw-thread $d$, which engages the female screw-thread $d'$ on the inner side of the lip of the cap. I cut a screw-thread upon that portion of the stem of the piston which projects outside the cap D, and secure upon it the weight $c^2$ between the jam-nuts $c^3$ and $c^4$. By means of these jam-nuts, it will be seen that the weight may be adjusted at different points on the stem. I also cast a rib, E, on the side of the cylinder A, to provide an excess of material at that point to enable me to bore the passage $e$ from the outer edge of the cylinder to the bottom. I then bore the passage $e^1$ transversely from the periphery of the cylinder to the center of the stem, and close the outer end of the transverse passage with the plug $e^2$. Finally, I bore the passage $e^3$ in the center of the stem. I cut away the inner portion of the shell of the cylinder at the upper end of the passage $e$, and it will thus be seen that I establish a channel from the interior of the cylinder to the lower end of the stem $a$, through which oil contained in the cylinder and above the piston can be conducted to the shaft F, upon which the hub B of the pulley has its bearing. I also provide an opening near the bottom of the cylinder, to which I affix the stop-cock $h$, either to let the air out of the cylinder when the piston is being depressed preparatory to filling the cylinder with oil, or to let air into the cylinder beneath the piston for the purpose of preventing the formation of a vacuum beneath the piston, as the case may require.

In operation, the effect of the centrifugal force generated by the revolution of the pulley to which the oil-cylinder is attached is to force the piston radially outward, and thus drive the oil contained in the cylinder into the passage $e$, through which and through the passages $e^1$ and $e^3$, it makes its way to the journal, as described. When the pulley is at rest, and the cylinder is in such a position that the weight $c^2$ hangs downward, the action of gravity upon the piston is counterbalanced by the spiral spring $c^1$, which is made stiff enough to prevent the fall of the piston under such circumstances. This spring also prevents the too violent movement of the piston outward, and that tendency is further resisted by atmospheric pressure so long as the stop-cock $h$ is kept closed. By altering the position of the weight $c^2$, the amount of centrifugal force acting upon the piston C may be varied. The farther the weight is from the journal the greater will be its tendency to pull out the piston, and vice versa.

It will, of course, be understood that the piston C may be made to move inward by centrifugal force by varying the organization of the structure—as, for example, by affixing a weight to one end of a lever so pivoted that its opposite end will act upon the end of the piston-stem, or by affixing the end of the piston-stem to a crooked arm or yoke extending to the opposite side of the hub, and projecting outward therefrom, and affording a means of supporting the weight in a position radially opposite the cylinder. In either of the latter cases the passage $e^3$ in the stem would be bored clear through into the cylinder, and the passages $e$ and $e^1$ would be dispensed with.

The plug $e^2$ may be made adjustable, and hence may answer the purpose of a valve for regulating the supply of oil from the reservoir to the channel. It will be seen that by means of this plug the capacity of the outlet $e$ to discharge oil from the cylinder may be varied at will.

I claim as my invention—

1. In an oiler for intermittently supplying oil to a journal, the oil-cylinder A, provided with the piston C and the passages $e\ e^1\ e^3$, constituting the channel of communication to the journal, substantially as described.

2. In an oiler, substantially such as described, the cylinder A, provided with the passages $e\ e^1\ e^3$, the piston C, and the stop-cock $h$, substantially as described.

3. In an oiler, substantially such as described, and operating as set forth, the valve-plug $e^2$, for adjusting the capacity of the outlet from the oil-cylinder to the journal, substantially as described.

EDWARD WESTON.

Witnesses:
 EDWD. PAYSON,
 GEO. W. MIATT.